US 12,525,250 B2

(12) United States Patent
Huang et al.

(10) Patent No.: US 12,525,250 B2
(45) Date of Patent: *Jan. 13, 2026

(54) CASCADE ARCHITECTURE FOR NOISE-ROBUST KEYWORD SPOTTING

(71) Applicant: Google LLC, Mountain View, CA (US)

(72) Inventors: Yiteng Huang, Mountain View, CA (US); Alexander H. Gruenstein, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,608

(22) Filed: Mar. 28, 2024

(65) Prior Publication Data

US 2024/0242728 A1 Jul. 18, 2024

Related U.S. Application Data

(63) Continuation of application No. 17/905,137, filed as application No. PCT/US2020/027337 on Apr. 8, 2020, now abandoned.

(51) Int. Cl.
*G10L 21/0216* (2013.01)
*G10L 15/08* (2006.01)
*G10L 15/22* (2006.01)

(52) U.S. Cl.
CPC .......... *G10L 21/0216* (2013.01); *G10L 15/08* (2013.01); *G10L 15/22* (2013.01);
(Continued)

(58) Field of Classification Search
CPC ..... G10L 21/0216; G10L 15/08; G10L 15/22; G10L 2015/088; G10L 2021/02166; G10L 15/05; G10L 21/0208; G06F 3/16
See application file for complete search history.

(56) References Cited

U.S. PATENT DOCUMENTS 10,304,475 B1 * 5/2019 Wang .................. G01S 3/80
10,911,881 B1 * 2/2021 Bulek ................. H04R 3/005
(Continued)

FOREIGN PATENT DOCUMENTS

CN 110718212 A 1/2020

OTHER PUBLICATIONS

Dec. 4, 2020 Written Opinion (WO) of the International Searching Authority (ISA) and International Search Report (ISR) issued in International Application No. PCT/US2020/027337.
(Continued)

*Primary Examiner* — Andrew C Flanders
*Assistant Examiner* — Cameron Kenneth Young
(74) *Attorney, Agent, or Firm* — Honigman LLP; Brett A. Krueger; Grant Griffith

(57) ABSTRACT

A method includes receiving, at a first processor of a user device, streaming multi-channel audio captured by an array of microphones, each channel including respective audio features. For each channel, the method also includes processing, by the first processor, using a first stage hotword detector, the respective audio features to determine whether a hotword is detected. When the first stage hotword detector detects the hotword, the method also includes the first processor providing chomped raw audio data to a second processor that processes, using a first noise cleaning algorithm, the chomped raw audio data to generate a clean monophonic audio chomp. The method also includes processing, by the second processor using a second stage hotword detector, the clean monophonic audio chomp to detect the hotword.

20 Claims, 7 Drawing Sheets

(52) U.S. Cl.
CPC .............. *G10L 2015/088* (2013.01); *G10L 2021/02166* (2013.01)

(56) References Cited

U.S. PATENT DOCUMENTS

| | | | |
|---|---|---|---|
| 11,159,878 B1* | 10/2021 | Chatlani | ............... H04R 3/005 |
| 11,217,235 B1* | 1/2022 | Chu | ............... H04R 1/406 |
| 11,380,312 B1* | 7/2022 | Mansour | ............... G10L 15/08 |
| 11,495,215 B1* | 11/2022 | Wu | ............... G10L 15/063 |
| 11,574,628 B1* | 2/2023 | Kumatani | ............... G06N 3/084 |
| 2014/0337036 A1* | 11/2014 | Haiut | ............... G10L 25/78 |
| | | | 704/275 |
| 2018/0330727 A1* | 11/2018 | Tulli | ............... G10L 15/32 |
| 2019/0207777 A1 | 7/2019 | Patel et al. | |
| 2019/0281341 A1* | 9/2019 | Lawrence | ....... H04N 21/41265 |

OTHER PUBLICATIONS

Japanese Office Action for the related Application No. 2022-561573, dated Oct. 16, 2023, 5 pages.

\* cited by examiner

CASCADE ARCHITECTURE FOR NOISE-ROBUST KEYWORD SPOTTING

CROSS-REFERENCE TO RELATED APPLICATIONS

This U.S. patent application is a continuation of, and claims priority under 35 U.S.C. § 120 from, U.S. patent application Ser. No. 17/905,137, filed on Aug. 26, 2022. The disclosure of this prior application is considered part of the disclosure of this application and is hereby incorporated by reference in its entirety

TECHNICAL FIELD

This disclosure relates to cascade architectures for noise-robust keyword spotting

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. These devices may include two or more microphones to record multi-channel audio. Neural networks have recently emerged as an attractive solution for training models to detect hotwords spoken by users in streaming audio. Typically, neural networks used to detect hotwords in streaming audio receive a single channel of streaming audio.

SUMMARY

One aspect of the disclosure provides a method for noise-robust keyword/hotword spotting in a cascade hotword detection architecture. The method includes receiving, at a first processor of a user device, streaming multi-channel audio captured by an array of microphones in communication with the first processor, each channel of the streaming multi-channel audio including respective audio features captured by a separate dedicated microphone in the array of microphones. The method also includes processing, by the first processor, using a first stage hotword detector, the respective audio features of at least one channel of the streaming multi-channel audio to determine whether a hotword is detected by the first stage hotword detector in the streaming multi-channel audio. The method further includes, when the first stage hotword detector detects the hotword in the streaming multi-channel audio, providing, by the first processor, chomped multi-channel raw audio data to a second processor of the user device, each channel of the chomped multi-channel raw audio data corresponding to a respective channel of the streaming multi-channel audio data and including respective raw audio data chomped from the respective channel of the streaming multi-channel audio. The method also includes processing, by the second processor, using a first noise cleaning algorithm, each channel of the chomped multi-channel raw audio data to generate a clean monophonic audio chomp, and processing using a second stage hotword detector, the clean monophonic audio chomp to determine whether the hotword is detected by the second stage hotword detector in the clean monophonic audio chomp. When the hotword is detected by the second stage hotword detector in the clean monophonic audio chomp, initiating, by the second processor, a wake-up process on the user device for processing the hotword and/or one or more other terms following the hotword in the streaming multi-channel audio.

Implementations of the disclosure may include one or more of the following optional features. In some implementations, the respective raw audio data of each channel of the chomped multi-channel raw audio data includes an audio segment characterizing the hotword detected by the first stage hotword detector in the streaming multi-channel audio. In these implementations, the respective raw audio data of each channel of the chomped multi-channel raw audio data further includes a prefix segment containing a duration of audio immediately preceding the point in time from when the first stage hotword detector detects the hotword in the streaming multi-channel audio.

In some examples, the second processor operates in a sleep mode when the streaming multi-channel audio is received at the first processor and the respective audio features of the at least one channel of the streaming multi-channel audio is processed by the first processor. In these examples, the providing of the chomped multi-channel audio raw data to the second processor invokes the second processor to transition from the sleep mode to a hotword detection mode. While in the hotword detection mode, the second processor may execute the first noise cleaning algorithm and the second stage hotword detector.

In some implementations, the method further includes processing, by the second processor while processing the clean monophonic audio chomp in parallel, using the second stage hotword detector, the respective raw audio data of one channel of the chomped multi-channel raw audio data to determine whether the hotword is detected by the second stage hotword detector in the respective raw audio data. Here, when the hotword is detected by the second stage hotword detector in either one of the clean monophonic audio chomp or the respective raw audio data, the method includes initiating, by the second processor, the wake-up process on the user device for processing the hotword and/or one or more other terms following the hotword in the streaming multi-channel audio. In these implementations, the method may further include, when the hotword is not detected by the second stage hotword detector in either one of the clean monophonic audio chomp or the respective raw audio data, preventing, by the second processor, initiation of the wake-up process on the user device.

In some examples, processing the respective audio features of the at least one channel of the streaming multi-channel audio to determine whether the hotword is detected by the first stage hotword detector in the streaming multi-channel audio includes processing the respective audio features of the at least one channel of the streaming multi-channel audio without canceling noise from the respective audio features. In some implementations, the method includes processing, by the first processor, the respective audio features of each channel of the streaming multi-channel audio to generate a multi-channel cross-correlation matrix. When the first stage hotword detector detects the hotword in the streaming multi-channel audio, the implementation further includes the method, for each channel of the streaming multi-channel audio, chomping, by the first processor, using the multi-channel cross-correlation matrix, the respective raw audio data from the respective audio features of the respective channel of the streaming multi-channel audio, and providing, by the first processor, the multi-channel cross-correlation matrix to the second processor. In these implementations, processing each channel of the chomped multi-channel raw audio data to generate the clean monophonic audio chomp includes computing, using the multi-channel cross-correlation matrix provided from the first processor, cleaner filter coefficients for the first noise cleaning algorithm, and processing, by the first noise cleaning algorithm having the computed cleaner filter coefficients, each channel of the chomped multi-channel raw audio data provided by the first processor to generate the clean monophonic audio chomp. In these implementations, processing the respective audio features of the at least one channel of the streaming multi-channel audio to determine whether the hotword is detected by the first stage hotword detector in the streaming multi-channel audio may include computing, using the multi-channel cross-correlation matrix, cleaner coefficients for a second noise cleaning algorithm executing on the first processor, while processing, by the second noise cleaning algorithm having the computed filter coefficients, each channel of the streaming multi-channel audio to generate a monophonic clean audio stream. In these implementations, the method further includes processing, using the first stage hotword detector, the monophonic clean audio stream to determine whether the hotword is detected by the first stage hotword detector in the streaming multi-channel audio. The first noise cleaning algorithm may apply a first finite impulse response (FIR) including a first filter length on each channel of the chomped multi-channel raw audio data to generate the chomped monophonic clean audio data, and the second noise cleaning algorithm may apply a second FIR including a second filter length on each channel of the streaming multi-channel audio to generate the monophonic clean audio stream. Here, the second filter length is less than the first filter length.

In some examples, the first processor includes a digital signal processor and the second processor includes a system on a chip (SoC) processor. In additional examples, the user device includes a rechargeable finite power source, the finite power source powering the first processor and the second processor.

Another aspect of the disclosure provides a system for noise-robust keyword spotting in a cascade architecture. The system includes data processing hardware including a first processor and a second processor, and memory hardware in communication with the data processing hardware. The memory hardware stores instructions that when executed by the data processing hardware cause the data processing hardware to perform operations that include receiving, at a first processor of a user device, streaming multi-channel audio captured by an array of microphones in communication with the first processor, each channel of the streaming multi-channel audio including respective audio features captured by a separate dedicated microphone in the array of microphones. The method also includes processing, by the first processor, using a first stage hotword detector, the respective audio features of at least one channel of the streaming multi-channel audio to determine whether a hotword is detected by the first stage hotword detector in the streaming multi-channel audio. The operations further include, when the first stage hotword detector detects the hotword in the streaming multi-channel audio, providing, by the first processor, chomped multi-channel raw audio data to a second processor, each channel of the chomped multi-channel raw audio data corresponding to a respective channel of the streaming multi-channel audio data and including respective raw audio data chomped from the respective channel of the streaming multi-channel audio. The operations further include processing, by the second processor, using a first noise cleaning algorithm, each channel of the chomped multi-channel raw audio data to generate a clean monophonic audio chomp, and processing using a second stage hotword detector, the clean monophonic audio chomp to determine whether the hotword is detected by the second stage hotword detector in the clean monophonic audio chomp. When the hotword is detected by the second stage hotword detector in the clean monophonic audio chomp, initiating, by the second processor, a wake-up process on the user device for processing the hotword and/or one or more other terms following the hotword in the streaming multi-channel audio.

Implementations of the disclosure may include one or more of the following optional features. In some implementations, the respective raw audio data of each channel of the chomped multi-channel raw audio data includes an audio segment characterizing the hotword detected by the first stage hotword detector in the streaming multi-channel audio. In these implementations, the respective raw audio data of each channel of the chomped multi-channel raw audio data further includes a prefix segment containing a duration of audio immediately preceding the point in time from when the first stage hotword detector detects the hotword in the streaming multi-channel audio.

In some examples, the second processor operates in a sleep mode when the streaming multi-channel audio is received at the first processor and the respective audio features of the at least one channel of the streaming multi-channel audio are processed by the first processor. In these examples, the providing of the chomped multi-channel audio raw data to the second processor invokes the second processor to transition from the sleep mode to a hotword detection mode. While in the hotword detection mode, the second processor may execute the first noise cleaning algorithm and the second stage hotword detector.

In some implementations, the operations further include processing, by the second processor while processing the clean monophonic audio chomp in parallel, using the second stage hotword detector, the respective raw audio data of one channel of the chomped multi-channel raw audio data to determine whether the hotword is detected by the second stage hotword detector in the respective raw audio data. When the hotword is detected by the second stage hotword detector in either one of the clean monophonic audio chomp or the respective raw audio data, the operations include initiating, by the second processor, the wake-up process on the user device for processing the hotword and/or one or more other terms following the hotword in the streaming multi-channel audio. In these implementations, the operations may further include, when the hotword is not detected by the second stage hotword detector in either one of the clean monophonic audio chomp or the respective raw audio data, preventing, by the second processor, initiation of the wake-up process on the user device.

In some examples, the processing of the respective audio features of the at least one channel of the streaming multi-channel audio to determine whether the hotword is detected by the first stage hotword detector in the streaming multi-channel audio includes processing the respective audio features of the one channel of the streaming multi-channel audio without canceling noise from the respective audio features. In some implementations, the operations further include processing, by the first processor, the respective audio features of each channel of the streaming multi-channel audio to generate a multi-channel cross-correlation matrix. When the first stage hotword detector detects the hotword in the streaming multi-channel audio, the operations further include, for each channel of the streaming multi-channel audio, chomping, by the first processor, using the multi-channel cross-correlation matrix, the respective raw audio data from the respective audio features of the respective channel of the streaming multi-channel audio, and providing, by the first processor, the multi-channel cross-correlation matrix to the second processor. In these implementations, processing each channel of the chomped multi-channel raw audio data to generate the clean monophonic audio chomp includes computing, using the multi-channel cross-correlation matrix provided from the first processor, cleaner filter coefficients for the first noise cleaning algorithm, and processing, by the first noise cleaning algorithm having the computed cleaner filter coefficients, each channel of the chomped multi-channel raw audio data provided by the first processor to generate the clean monophonic audio chomp. In these implementations, processing the respective audio features of the at least one channel of the streaming multi-channel audio to determine whether the hotword is detected by the first stage hotword detector in the streaming multi-channel audio includes computing, using the multi-channel cross-correlation matrix, cleaner coefficients for a second noise cleaning algorithm executing on the first processor, while processing, by the second noise cleaning algorithm having the computed filter coefficients, each channel of the streaming multi-channel audio to generate a monophonic clean audio stream. In these implementations, the operations further include processing, using the first stage hotword detector, the monophonic clean audio stream to determine whether the hotword is detected by the first stage hotword detector in the streaming multi-channel audio. The first noise cleaning algorithm may apply a first finite impulse response (FIR) including a first filter length on each channel of the chomped multi-channel raw audio data to generate the chomped monophonic clean audio data, and the second noise cleaning algorithm may apply a second FIR including a second filter length on each channel of the streaming multi-channel audio to generate the monophonic clean audio stream. Here, the second filter length is less than the first filter length.

In some examples, the first processor includes a digital signal processor and the second processor includes a system on a chip (SoC) processor. In additional examples, the user device includes a rechargeable finite power source, the finite power source powering the first processor and the second processor.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
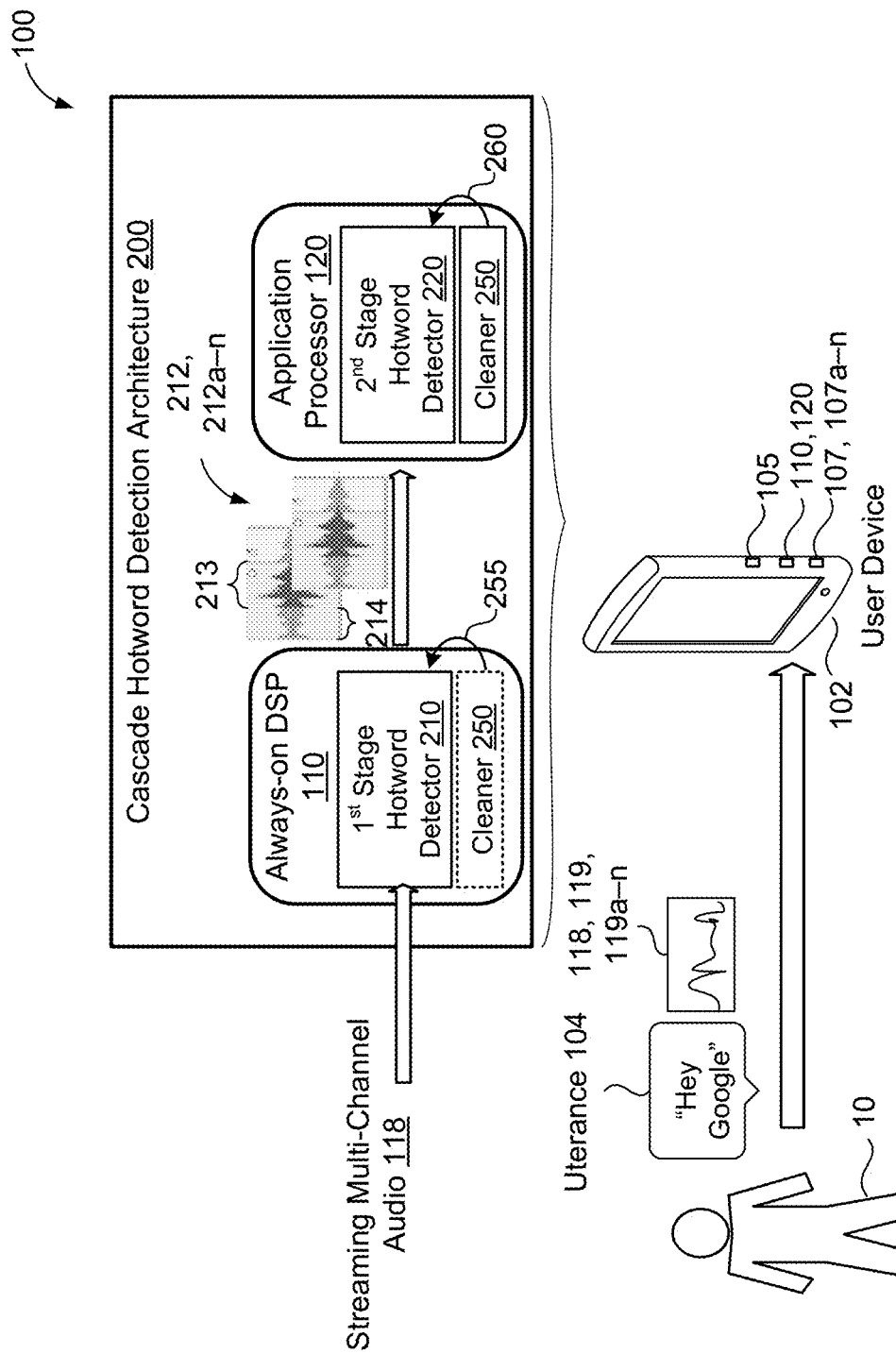
FIG. 1 is a schematic view of an example system including cascade hotword detection architecture for noise-robust keyword spotting.

A voice-enabled device (e.g., a user device executing a voice assistant) allows a user to speak a query or a command out loud and field and answer the query and/or perform a function based on the command. Through the use of a "hotword" (also referred to as a "keyword", "attention word", "wake-up phrase/word", "trigger phrase", "invocation phrase", or "voice action initiation command"), in which by agreement a predetermined term/phrase that is spoken to invoke attention for the voice enabled device is reserved, the voice enabled device is able to discern between utterances directed to the system (i.e., to initiate a wake-up process for processing one or more terms following the hotword in the utterance) and utterances directed to an individual in the environment. Typically, the voice-enabled device operates in a sleep state to conserve battery power and does not process input audio data unless the input audio data follows a spoken hotword. For instance, while in the sleep state, the voice-enabled device captures streaming input audio via multiple microphones and uses a hotword detector trained to detect the presence of the hotword in the input audio. When the hotword is detected in the input audio, the voice-enabled device initiates a wake-up process for processing the hotword and/or any other terms in the input audio following the hotword.

Hotword detection is analogous to searching for a needle in a haystack because the hotword detector must continuously listen to streaming audio, and trigger correctly and instantly when the presence of the hotword is detected in the streaming audio. In other words, the hotword detector is tasked with ignoring streaming audio unless the presence of the hotword is detected. Neural networks are commonly employed by hotword detectors to address the complexity of detecting the presence of a hotword in a continuous stream of audio.

User devices (e.g., computing devices), and more particularly mobile user devices, such as smart phones, tablets, smart watches, and smart headphones, powered by a rechargeable finite power source (e.g., a battery), are typically embedded systems with restricted battery life and limited computational capacity. That is, when a battery-powered device provides access to voice-enabled applications (e.g., digital assistant), energy resources can be further limited when the device is tasked with constantly processing audio data and/or other data for detection of hotword signals for invoking the voice-enabled applications. In configurations when battery-powered voice-enabled user devices include a device system on a chip (SoC) (e.g., application processor (AP)), the device SoC can consume a substantial proportion of energy relative to other subsystems (e.g., network processor, digital signal processor (DSP), etc.) when the user is interacting with the user device via speech.

One design objective for voice-enabled user devices is to obtain noise robustness for accurately detecting hotwords. For user devices including two or more microphones, statistical speech enhancement algorithms may work on multi-microphone noisy signals to produce a monophonic audio stream with an improved signal-to-noise ratio (SNR). As such, user devices including two or more microphones may use a hotword cleaner algorithm that employs a statistical speech enhancement algorithm to improve SNR, and thus, increase hotword detection accuracy in noise environments. Generally, the user device will use the hotword cleaner algorithm to obtain a clean monophonic audio stream and employ a parallel hotword detection architecture that performs hotword detection in two branches using the same model but independently on two different inputs: a raw microphone signal and the clean monophonic audio stream. Here, binary yes/no decisions made by the two branches indicating whether or not the hotword is detected are combined with a logical OR operation. While the using of the hotword cleaner algorithm in conjunction with the parallel hotword detection architecture delivers unsacrificed hotword detection accuracy in both clean and noisy acoustic environments, the parallel hotword detection architecture is typically not suitable for use on battery-powered devices (e.g., mobile devices) since the parallel hotword detection uses a large computational load requiring increased power consumption that quickly depletes battery-life.

The hotword detectors employed by battery-powered user devices must implement hotword detection algorithms that not only detect hotwords with a degree of accuracy, but must also achieve conflicting objectives of low latency, small memory footprint, and light computational load. To obtain these objectives, the user devices may employ a cascade hotword detection architecture that includes two hotword detectors: a first-stage hotword detector and a second stage hotword detector. Here, the first-stage hotword detector resides on a specialized DSP (e.g., a first processor), includes a small model size, and is computationally efficient for coarsely screening an input audio stream for hotword candidates. Detection of a hotword candidate in the input audio stream by the first-stage hotword detector triggers the DSP to pass/provide a small buffer/chomp of audio data of a duration suitable for safely containing the hotword to the second-stage hotword detector residing/executing on the device SoC. Then, the second-stage hotword detector on the device SoC (e.g., the main AP) includes a larger model size and provides more computational output than the first-stage hotword detector for providing a more accurate detection of the hotword, and thus, serve as the final arbitrator for deciding if the input audio stream does in fact include the hotword. This cascade architecture allows the more power consuming device SoC to operate in a sleep mode to reserve battery-life until the first-stage hotword detector running/executing on the DSP detects a candidate hotword in streaming input audio. Only once the candidate hotword is detected, does the DSP trigger the device SoC to transition from the sleep mode and into a hotword detection mode for running the second-stage hotword detector. These conventional hotword detection cascade architectures residing on user devices having two or more microphones do not leverage streaming multi-channel audio input from the two or more microphones to obtain noise robustness (e.g., adaptive noise cancellation) to increase hotword detection accuracy.

Implementations herein are directed toward incorporating a hotword cleaning algorithm into a cascade architecture for hotword detection on voice-enabled user devices. In some examples, the voice-enabled user device is a battery-powered user device (e.g., a mobile device) constrained by restricted battery life and limited computational capacity. As will become apparent, various architectures are disclosed for jointly optimizing power consumption, latency, and noise robustness by splitting and allocating workloads for hotword detection with cleaner to a DSP (i.e., first processor) of the user device and an application processor (AP) (i.e., second processor) of the user device.

Referring to FIG. 1, in some implementations, an example system 100 includes one or more user devices 102 associated with a respective user 10. Each of the one or more user devices 102 may correspond to a computing device, such as a mobile phone, computer, wearable device, smart appliance, audio infotainment system, smart speaker, etc., and is equipped with memory hardware 105 and data processing hardware that collectively includes a first processor 110 (e.g., digital signal processor (DSP)) and a second processor 120 (e.g., application processor (AP)). The first processor 110 consumes less power while operating than the second processor 120 consumes while operating. As used herein, the first processor 110 may be interchangeably referred to as a DSP and the second processor 120 may be interchangeably referred to as an "AP" or a "device SoC". The first and second processors 110, 120 provide the cascade hotword detection architecture 200 in which a first stage hotword detector 210 runs on the first processor 110 and a second stage hotword detector 220 runs on the second processor 120 for cooperatively detecting the presence of a hotword in streaming multi-channel audio 118 in a manner that optimizes power consumption, latency, and noise robustness. The multi-channel streaming audio 118 includes two or more channels 119, 119a-n of audio.

Generally, the first stage hotword detector 210 resides on a specialized DSP 110, includes a smaller model size than a model associated with the second stage hotword detector 220, and is computationally efficient for coarsely screening input streaming multi-channel audio 118 for hotword candidates. Accordingly, the specialized DSP 110 (e.g., first processor) may be "always-on" so that the first stage hotword detector 210 is always running to coarsely screen for hotword candidates in multi-channel audio 118, while all other components of the user device 102, including the main AP 120 (e.g., second processor), are in a sleep state/mode to conserve battery life. On the other hand, the second stage hotword detector 220 resides on the main AP 120, includes a larger model size and provides more computational output than the first stage hotword detector 210 for providing a more accurate detection of the hotword that was initially detected by the first stage hotword detector 210. Thus, the second stage hotword detector 220 may be more stringent in determining whether or not the hotword is present in the audio 118. While the DSP 110 is "always-on", the more power consuming main AP 120 operates in a sleep mode to reserve battery-life until the first stage hotword detector 210 at the DSP 110 detects the candidate hotword in the streaming multi-channel audio 118. Thus, only once the candidate hotword is detected, does the DSP 110 trigger the main AP 120 to transition from the sleep mode and into a hotword detection mode for running the second stage hotword detector 220.

In the example shown, when the user 10 speaks an utterance 104 including a hotword (e.g., "Hey Google"), the utterance 104 is captured as multi-channel streaming audio 118 by the user device 102. The cascade hotword detection architecture 200 residing on the user device 102 is configured to detect the presence of the hotword in the utterance 104 to initiate/trigger a wake-up process on the user device 102 for processing the hotword and/or one or more terms (e.g., query or command) following the hotword in the utterance 104. For instance, the wake-up process can include the user device 102 locally executing an automatic speech recognition (ASR) system for recognizing (e.g., transcribing) the hotword and/or the one or more terms following the hotword, or the wake-up process can include the user device 102 transmitting audio data containing the hotword and/or the one or more other terms to a remote computing device (e.g., server or cloud computing environment) that includes an ASR system for performing speech recognition on the audio data.

The one or more user devices 102 may include (or be in communication with) two or more microphones 107, 107a-n to capture an utterance 104 from the user 10. Each microphone 107 may separately record the utterance 104 on a separate dedicated channel 119 of the multi-channel streaming audio 118. For example, the user device 102 may include two microphones 107 that each record the utterance 104, and the recordings from the two microphones may be combined into two-channel streaming audio 118 (i.e., stereophonic audio or stereo.) In some examples, the user device 102 includes more than two microphones. That is, the two or more microphones reside on the user device 102. Additionally or alternatively, the user device 102 may be in communication with two or more microphones separate/remote from the user device 102. For example, the user device may be a mobile device disposed within a vehicle and in wired or wireless communication (e.g., Bluetooth) with two or more microphones of the vehicle. In some configurations, the user device 102 is in communication with at least one microphone 107 residing on a separate device. In these configurations, the user device 102 may also be in communication with one or more microphones 107 residing on the user device 102.

Upon receiving the multi-channel streaming audio 118, the always-on DSP 110 executes/runs the first stage hotword detector 210 for determining whether a hotword is detected in the respective audio features of at least one channel 119 of the streaming multi-channel audio 118. In some examples, the first stage hotword detector 210 calculates a probability score indicating a presence of a hotword in the respective audio features from the single channel 119 of the streaming multi-channel audio 118. In some examples, a determination that a probability score of the respective audio features satisfies a hotword threshold (e.g., when the probability score is greater than or equal to the hotword threshold) indicates that the hotword is present in the streaming multi-channel audio 118. Notably, the AP 120 may operate in the sleep mode when the multi-channel audio is received at the DSP 110 and while the DSP 110 processes the respective audio features of the at least one channel 119 of the streaming multi-channel audio 118. In some examples, the "processing" of the respective audio features by the DSP 110 includes running a cleaner 250 that processes the respective audio features of each channel 119 of the streaming multi-channel audio 118 to generate a monophonic clean audio stream 255, and then executing/running the first stage hotword detector 210 to determine whether the candidate hotword is detected in the monophonic clean audio stream 255. As described in greater detail below, the cleaner 250 employs a noise cleaning algorithm to provide adaptive noise cancellation to the multi-channel noisy audio. In other examples, the "processing" of the respective audio features by the DSP 110 omits the use of the cleaner 250 and simply includes processing the respective audio features of one channel 119 of the streaming multi-channel audio 118 without canceling noise from the respective audio features. In these examples, channel 119 from which the respective audio features are processed may be arbitrarily selected.

When the first stage hotword detector 210 detects the hotword in the streaming multi-channel audio 118, the DSP 110 provides chomped multi-channel raw audio data 212, 212a-n to the AP 120. In some examples, the DSP 110 providing the chomped multi-channel raw audio data 212 to the AP 120 triggers/invokes the AP 120 to transition from the sleep mode to the hotword detection mode. Optionally, the DSP 110 may provide another signal or instruction that triggers/invokes the AP 120 to transition from the sleep mode to the hotword detection mode. Each channel of the chomped multi-channel raw audio data 212a-n corresponds to a respective channel 119a-n of the streaming multi-channel audio 118 and includes raw audio data chomped from the respective audio features of the respective channel 119 of the streaming multi-channel audio 118. In some implementations, each channel of the chomped multi-channel raw audio data 212 includes an audio segment characterizing the hotword detected by the first stage hotword detector 210 in the streaming multi-channel audio 118. That is, the audio segment associated with each channel of the chomped multi-channel raw audio data 212 includes a duration sufficient to safely contain the detected hotword. Additionally, each channel of the chomped multi-channel raw audio data 212 includes a prefix segment 214 containing a duration of audio immediately preceding the point in time from when the first stage hotword detector 210 detects the hotword in the streaming multi-channel audio 118. A portion of the each channel for the chomped multi-channel raw audio data 212 may also include a suffix segment containing a duration of audio subsequent to the audio segment 213 containing the detected hotword.

Once operating in the hotword detection mode, the AP 120 executes/runs a cleaner 250 in order to leverage the streaming multi-channel audio 118 input from the two or more microphones 107 to obtain noise robustness (e.g., adaptive noise cancellation) for increasing hotword detection accuracy. Specifically, the cleaner 250 includes a first noise cleaning algorithm that the AP 120 uses for processing each channel of the chomped multi-channel raw audio data 212 to generate a clean monophonic audio chomp 260. Importantly, the cleaner 250 requires each channel of the chomped multi-channel raw audio data 212 to include a prefix segment 214 of buffered audio samples immediately preceding the detected hotword in order to sufficiently apply adaptive noise cancellation. The length of the prefix segment 214 needs to be longer when the cleaner 250 is employed than in configurations when the architecture does not include the cleaner 250. For instance, the length of the prefix segment 214 would only need to be about two (2) seconds without the cleaner. Generally, longer prefix segments 214 (e.g., longer duration of buffered audio samples) increase the performance of the cleaner 250, while at the same time, also increase the latency since the second stage hotword detector 220 is ultimately processing the prefix segment 214 in order to catch up to real-time detection of the hotword. Accordingly, the cascade hotword detection architecture 200 may choose a length of the prefix segment 214 that balances latency and cleaner performance. Next, the AP 120 executes the second stage hotword detector 220 to process the clean monophonic audio chomp 260 to determine whether the hotword is present in the clean monophonic audio chomp 260.

When the hotword is detected by the second stage hotword detector 220, the AP 120 initiates a wake-up process on the user device 102 for processing the hotword and/or one or more other terms following the hotword in the streaming multi-channel audio 118. As with the first stage hotword detector 210, the second stage hotword detector 220 may detect the presence of the hotword when a probability score associated with the respective clean monophonic audio chomp 260 or the respective raw audio data 212 satisfies a probability score threshold. The value of the probability score threshold used by the second stage hotword detector 220 may be the same or different than the value of the probability score threshold used by the first stage hotword detector 210.

As mentioned above, the DSP 110 may employ a cleaner 250 that executes a second noise cleaning algorithm prior to executing the first stage hotword detector 210 to obtain noise robustness (e.g., adaptive noise cancellation) for increasing hotword detection accuracy of the first stage hotword detector 210. While a filter model for the first and second noise cleaning algorithms may be the same, the second noise cleaning algorithm may include a shorter length (e.g., less filtering parameters) since the DSP 110 includes a lower computational power than the computational power of the AP 120. Accordingly, the cleaner 250 employed by the DSP 110 sacrifices some performance (e.g., signal-to-noise ratio (SNR) performance) compared to the cleaner employed by the AP 120, but still provides adequate noise robustness to improve the accuracy of the first stage hotword detector 210.

The AP 120 may process the clean monophonic audio chomp 260 in parallel with processing the respective raw audio data 212a of one channel of the chomped multi-channel raw audio data 212 to determine whether the hotword is detected by the second stage hotword detector 220. Here, when the second stage hotword detector 220 detects the hotword in either the clean monophonic audio chomp 260 or the respective raw audio data 212a, the AP initiates/triggers a wake-up process on the user device 102 to process the hotword and/or one or more other terms following the hotword in the streaming multi-channel audio 118. If the second stage hotword detector 220 does not detect the hotword in either the clean monophonic audio chomp 260 or the respective raw audio data 212a, the AP 120 prevents the wake-up process on the user device 102. The wake-up process may include the user device 102 performing speech recognition on the hotword and/or one or more other terms locally, or the wake-up process may include the user device 102 transmitting audio data containing the hotword and/or the one or more other terms to a remote server to perform speech recognition thereon. In some examples, the user device 102 may transmit audio data containing the hotword detected by the AP 120 to the remote server to verify that the hotword is present, and thus serve as a third stage hotword detector.

Figure 2A:
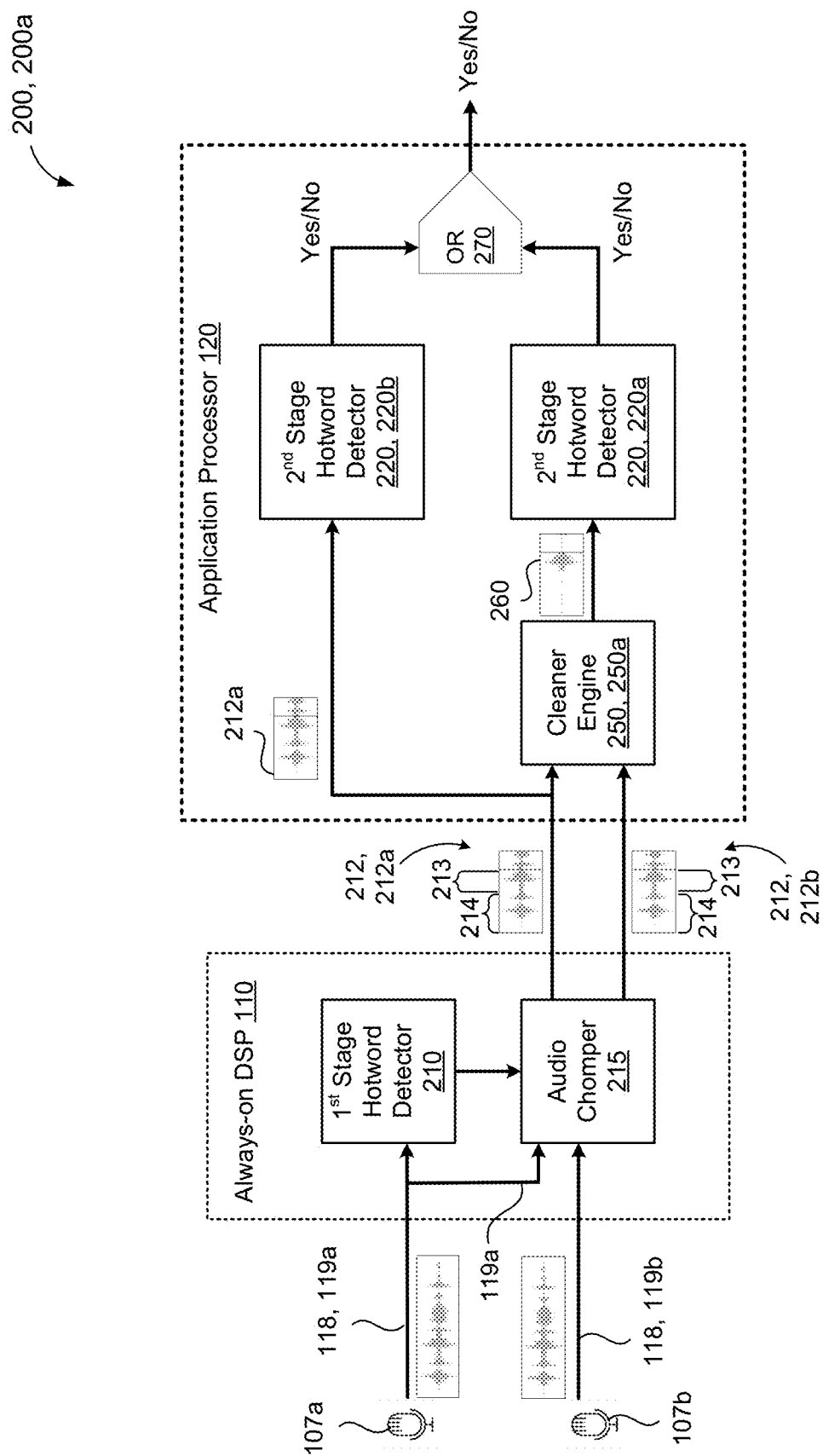
FIGS. 2A-2C are schematic views of example cascade hotword detection architectures.
Figure 2B:
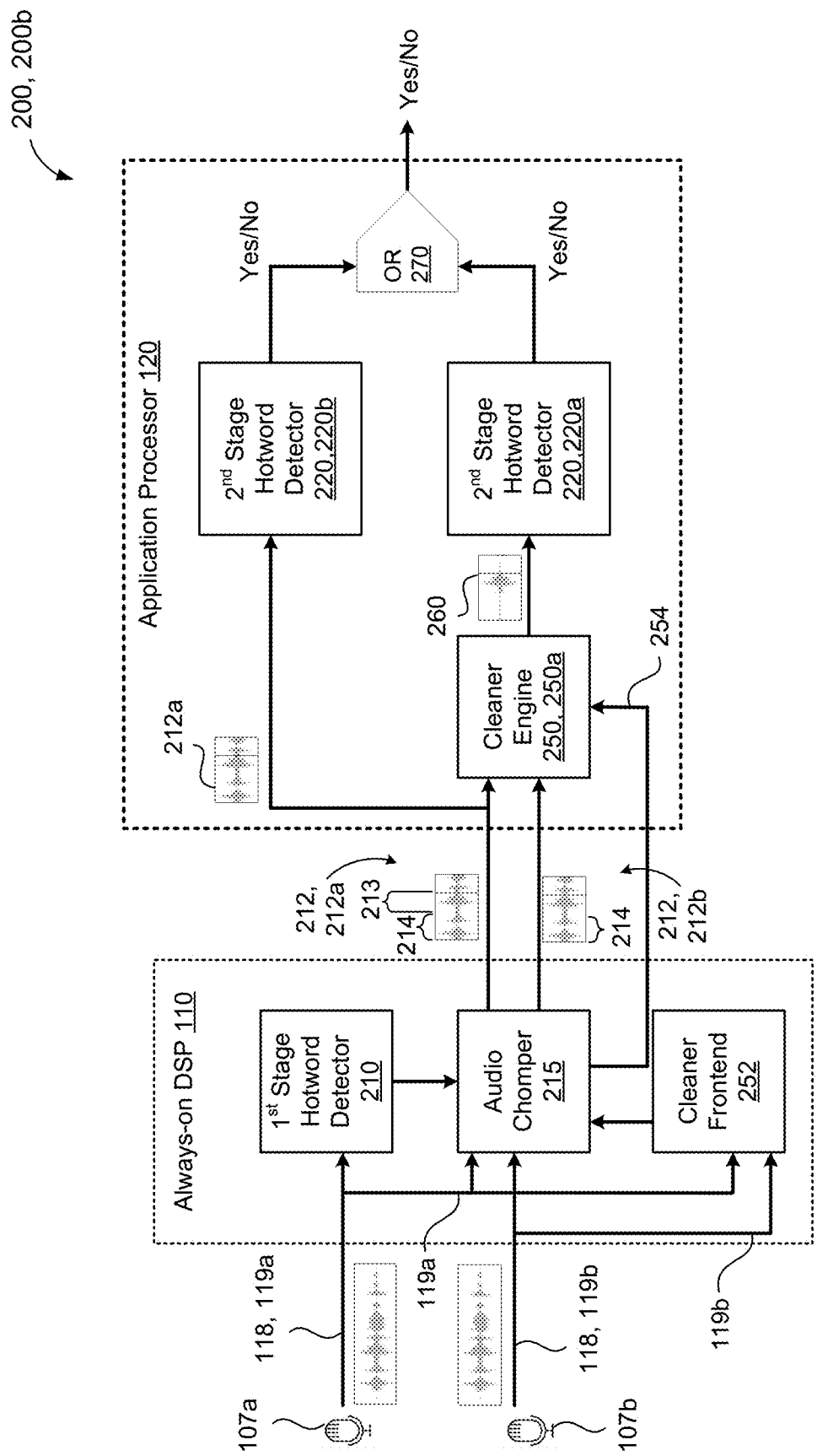
Figure 2C:
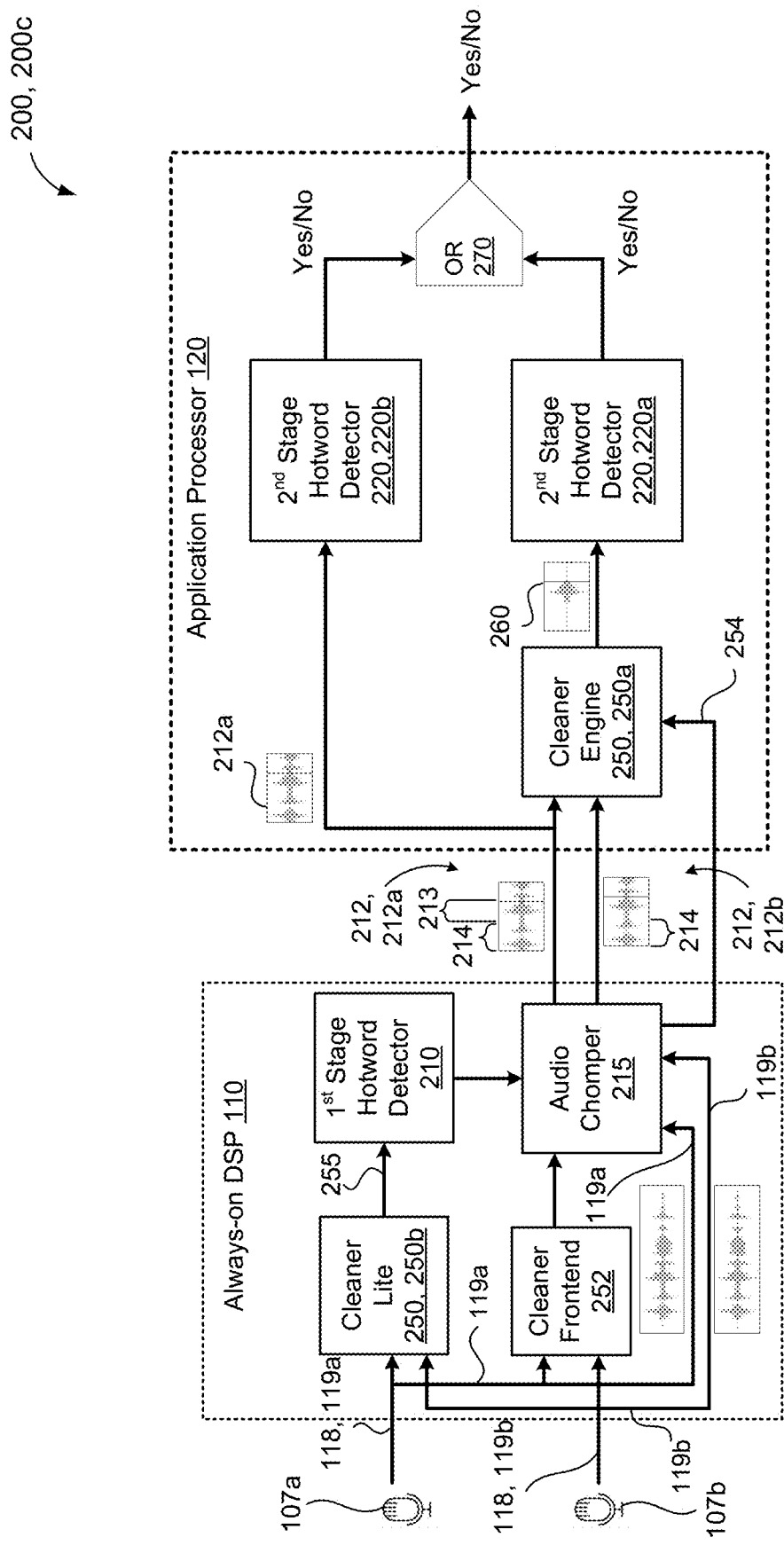

FIGS. 2A-2C show examples of the cascade hotword detection architecture 200, 200a-c that may reside on the user device 102 of FIG. 1 for detecting the presence of hotwords in spoken utterances 104. Referring to FIG. 2A, the example cascade architecture 200a includes only a single cleaner 250, 250a residing on the AP 120 for use by the second stage hotword detector 220 such that the first-stage hotword detector 210 does not benefit from any noise cleaning algorithms.

In the example shown, for simplicity, the streaming multi-channel audio 118 includes two channels 119a, 119b each including respective audio features captured by a separate dedicated microphone 107a-b in an array of two microphones 107. However, the streaming multi-channel audio 118 can include more than two channels without departing from the scope of the present disclosure.

FIG. 2A shows the always-on DSP 110 (e.g., first processor) including/executing the first stage hotword detector 210 and the audio chomper 215. The first stage hotword detector 210 receives, as input, only the audio features from a single channel 119a of the streaming multi-channel audio 118, wherein the channel 119a received by the first stage hotword detector 210 may be arbitrary. Here, the DSP 110 uses/executes the first stage hotword detector 210 to process the respective audio features of the channel 119a to determine whether a hotword is detected by the first stage hotword detector 210 in the streaming multi-channel audio 118. The first stage hotword detector 210 may calculate a probability score indicating a presence of the hotword in the respective audio features from the single channel 119a of the streaming multi-channel audio 118. In some examples, a determination that a probability score of the respective audio features satisfies a hotword threshold (e.g., when the probability score is greater than or equal to the hotword threshold) indicates that the hotword is present in the streaming multi-channel audio 118.

When the first stage hotword detector 210 detects the hotword in the streaming multi-channel audio 118 (e.g., in the first channel 119a), the DSP 110 triggers/fires the audio chomper 215 to generate and provide chomped multi-channel raw audio data 212, 212a-b to the AP 120. Here, each channel of the chomped multi-channel raw audio data 212 corresponds to a respective channel 119a-b of the streaming multi-channel audio 118 and includes respective raw audio data chomped from the respective channel 119a-b that contains the hotword detected by the first stage hotword detector 210. The providing of the chomped multi-channel raw audio data 212 from the DSP 110 to the AP 120 may invoke the AP 120 to transition from the sleep mode to the hotword detection mode in which the AP 120 executes the first noise cleaning algorithm on the cleaner engine 250a and the second stage hotword detector 220. Notably, in the cascade hotword detection architecture 200a of FIG. 2A, the DSP 110 does not employ a noise cleaning algorithm on the streaming multi-channel audio 118, and therefore, the first stage hotword detector 210 does not benefit from adaptive noise cancellation when determining whether the presence of the hotword is detected in the noisy respective audio features of the single channel 119a. In other words, processing the respective audio of the one channel 119a of the streaming multi-channel audio 118 occurs without canceling noise from the respective audio features.

In cascade hotword detection architecture 200a of FIG. 2A, the entire cleaner 250 executes on the AP 220 as a cleaner engine 250a that uses a first noise cleaning algorithm to process each channel of the chomped multi-channel raw audio data 212 to generate a clean monophonic audio chomp 260. As will be described in greater detail below with reference to FIG. 3, cleaning operations performed by the cleaner engine 250a are relatively computationally complicated and require each channel of the chomped multi-channel raw audio data 212a, 212b to include a prefix segment 214 of a duration that is longer than the duration of a prefix segment in a chomp if no cleaning algorithms were being applied. For instance, when no cleaning algorithms are being applied at the AP 120 such that only raw audio data chomps are passed to the second stage hotword detector 220, the prefix segment 214 of each chomp may include a duration of about two (2) seconds. However, when the cleaning engine 250a is employed to process each channel of the chomped multi-channel raw audio data 212, the cleaning engine 250a needs to see a duration of audio prior to the hotword that contains only noise in order to estimate an effective noise-cancellation filter for generating the clean monophonic audio chomp 260. Accordingly, the performance (e.g., SNR) of the cleaning engine 250a increases the longer the duration of the prefix segment 214 that contains noisy audio before the audio segment 213 containing the detected hotword. However, longer prefix segments 214 result in increased latency costs due to the cleaning engine 250a and the second stage hotword detector 220 having to process longer prefix segments 214 in the multi-channel raw audio data 212. This increased latency is due to the second stage hotword detector 220 needing to process the longer prefix segment 214 in order to catch up to real-time detection of the hotword contained in the audio segment 213. In one example, the audio chomper 215 at the DSP generates prefix segments 214 with a duration/length equal to about 3.5 seconds to balance cleaner performance and latency. A portion of the each channel for the chomped multi-channel raw audio data 212 may also include a suffix segment containing a duration of audio subsequent to the audio segment 213 containing the detected hotword.

While in the hotword detection mode, the second stage hotword detector 220 executing on the AP 120 is configured to process the clean monophonic audio chomp 260 output from the cleaner engine 250a to determine whether the hotword is detected in the clean monophonic audio chomp 260. In some examples, the second stage hotword detector 220 corresponds to a parallel hotword detection architecture that performs hotword detection in two branches 220a, 220b using the same model but independently on two different inputs: the respective raw audio data 212a of one channel of the chomped multi-channel raw audio data 212; and the clean monophonic audio chomp 260. The channel associated with the respective raw audio data 212a provided as input to the second branch 220b of the second stage hotword detector 220 may be arbitrary. Accordingly, the AP 120 may process the clean monophonic audio chomp 260 at a first branch 220a of the second stage hotword detector 220 in parallel with processing the respective raw audio data 212a of the one channel of the chomped multi-channel raw audio data 212 at the second branch 220b of the second stage hotword detector 220. In the example shown, when a logical OR 270 operation indicates that the hotword is detected by the second stage hotword detector 220 in either one of the clean monophonic audio chomp 260 (e.g., at the first branch 220a) or the respective raw audio data 212a (e.g. at the second branch 220b), the AP 120 initiates a wake-up process on the user device 102 for processing the hotword and/or one or more other terms following the hotword in the streaming multi-channel audio 118. As with the first stage hotword detector 210, the second stage hotword detector 220 may detect the presence of the hotword when a probability score associated with the respective clean monophonic audio chomp 260 or the respective raw audio data 212 satisfies a probability score threshold. The probability score threshold used by the second stage hotword detector 220 may be the same or different value than the probability score threshold used by the first stage hotword detector 210.

To minimize the length of the prefix segment 214 of each channel of the chomped multi-channel raw audio data 212 provided from the DSP 110, and thus, reduce latency of the cleaner engine 250a in processing each channel of the chomped multi-channel raw audio data 212 to generate the clean monophonic audio chomp 260, the example cascade hotword architecture 200b of FIG. 2B includes the DSP 110 executing a cleaner frontend 252 tasked with updating and buffering multi-microphone cross-correlation matrices 254. As will become apparent, the cleaner frontend 252 is configured to extract acoustic features from the streaming multichannel raw audio data 212 prior to chomping at the audio chomper 215, thereby tracking these extracted acoustic features for use by the cleaner engine 250a up to the point where the audio is chomped, similar to a multichannel full-band cross-correlation matrix or multichannel sub band coherence matrices. Here, each multi-microphone cross-correlation matrix 254 corresponds to noise cancellation between the respective audio features of the streaming multi-channel audio 118. In contrast to the cascade hotword detection architecture 200a of FIG. 2A, the cleaner engine 250a at the AP 120 is no longer tasked with computing/generating multi-microphone cross-correlation matrices 254, and thus, can now process chomped multi-channel raw audio data 212 with prefix segments 214 containing shorter durations of audio immediately preceding the point in time from when the first stage hotword detector detects the hotword in the streaming multi-channel audio 118. For instance, the length of the prefix segment 114 may be less than (<) 3.5 seconds. Latency is inherently improved by permitting the AP 120 to process raw audio data 212 with prefix segments 214 of shorter duration. In the example shown, for simplicity, the streaming multi-channel audio 118 includes two channels 119a, 119b each including respective audio features captured by a separate dedicated microphone 107a-b in an array of two microphones 107. However, the streaming multi-channel audio 118 can include more than two channels without departing from the scope of the present disclosure.

FIG. 2B shows the always-on DSP 110 (e.g., first processor) including/executing the first stage hotword detector 210, the audio chomper 215, and the cleaner frontend 252. The first stage hotword detector 210 receives, as input, only the audio features from a single channel 119a of the streaming multi-channel audio 118, wherein the channel 119a of audio features may be arbitrary. Here, the DSP 110 uses/executes the first stage hotword detector 210 to process the audio features to determine whether a hotword is detected by the first stage hotword detector 210 in the streaming multi-channel audio 118. At the same time, the audio chomper 215 and the cleaner frontend 252 receive the respective audio features of each channel 119a, 119b of the streaming multi-channel audio 118 such that the cleaner frontend 252 generates the multi-channel cross-correlation matrix 254 associated with the calculation of noise cancellation between the respective audio features of each channel 119a, 119b of the streaming multi-channel audio 118. More specifically, the cleaner frontend 252 continuously calculates/updates and buffers the multi-channel cross-correlation matrix 254 as the streaming multi-channel audio 118 is received. The cleaner frontend 252 may buffer the multi-channel cross-correlation matrices 254 in the memory hardware 105 (FIG. 1) of the user device 102.

Figure 3:
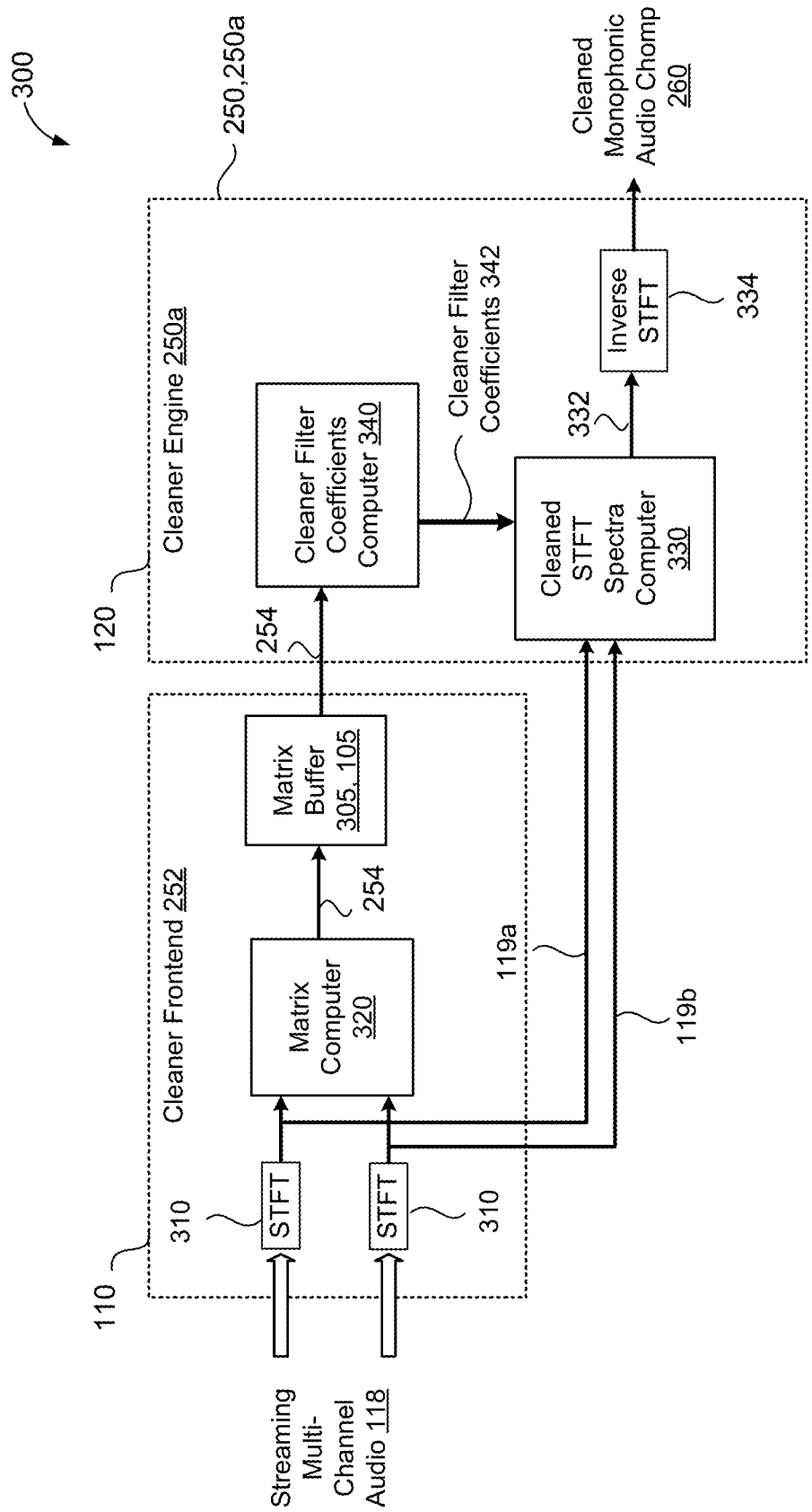
FIG. 3 is a schematic view of a cleaner task division for the cascade detection architectures of FIGS. 2B and 2C.

FIG. 3 shows a schematic view 300 depicting example cleaning subtasks performed by the cleaner frontend 252 executing at the always-on DSP 110 and the cleaner engine 250a executing at the AP 120 when the AP 120 is in the hotword detection mode. The cleaner frontend 252 may include Short-time Fourier transform (STFT) modules 310, 310a-b each configured to convert the respective audio features of each channel of the streaming multi-channel audio 118 into the STFT spectra, whereby the converted respective audio features are provided as input to a matrix computer 320 at the cleaner frontend 252 and a cleaned STFT spectra computer 330 at the cleaner engine 250a.

The matrix computer 320 at the cleaner frontend 252 is configured to continuously compute/update and buffer the multi-channel cross-correlation matrix 254 based on the converted respective audio features on each channel 119a, 119b. The matrix computer 320 may buffer the matrix 254 in a matrix buffer 305. The matrix buffer 305 is in communication with the DSP 110 and may reside on the memory hardware 105 (FIG. 1) of the user device 102. Upon the first stage hotword detector 210 detecting the hotword to trigger/invoke the AP 120 to transition from the sleep mode to the hotword detection mode, the DSP 110 may pass the multi-channel cross-correlation matrix 254 stored in the buffer to the cleaner engine 250a at the AP 120. More specifically, the cleaner engine 250a includes a cleaner filter coefficients computer 340 configured to compute cleaner filter coefficients 342 for the first noise cleaning algorithm based on the multi-channel cross-correlation matrix 254 received from the DSP 110. Here, the cleaned STFT spectra computer 330 corresponds to a noise cancellation filter executing the first noise cleaning algorithm having computed cleaner filter coefficients 342, whereby an STFT output 332 of the cleaned STFT spectra computer 330 is converted by an STFT inverse module 334 to generate the clean monophonic audio chomp 260. In some examples, the cleaned STFT spectra computer 330 includes a finite impulse response (FIR) filter.

Referring back to FIG. 2B, the first stage hotword detector 210 may calculate a probability score indicating a presence of a hotword in the respective audio features from a single channel 119a of the streaming multi-channel audio 118. In some examples, a determination that a probability score of the respective audio features satisfies a hotword threshold (e.g., when the probability score is greater than or equal to the hotword threshold) indicates that the hotword is present in the streaming multi-channel audio 118. In some implementations, when the first stage hotword detector 210 detects the hotword in the streaming multi-channel audio 118, the DSP 110 triggers/fires the audio chomper 215 to use the multi-channel cross-correlation matrix 254 generated and stored in the buffer 305 by the cleaner frontend 252 for chomping the respective raw audio data 212a, 212b from the respective audio features of each respective channel 119a, 119b of the streaming multi-channel audio 118. Thereafter, the audio chomper 215 provides the chomped multi-channel raw audio data 212 to the cleaner engine 250a at the AP 120. Here, the providing of the chomped multi-channel raw audio data 212 from the DSP 110 to the AP 120 may invoke/trigger the AP 120 to transition from the sleep mode to a hotword detection mode in which the AP 120 executes the first noise cleaning algorithm 250a and the second stage hotword detector 220.

Detection of the hotword by the first stage hotword detector 210 also causes the DSP 110 to instruct the cleaner frontend 252 to provide the multi-channel cross-correlation matrix 254 to the cleaner engine 250a of the AP 120. Here, the cleaner engine 250a uses the multi-channel cross-correlation matrix 254 to compute cleaner filter coefficients 342 for the first noise cleaning algorithm. Thereafter, the cleaner engine 250a executes the first noise cleaning algorithm having the computed cleaner coefficients 342 to process each channel of the chomped multi-channel audio data 212 provided from the audio chomper 215 to generate the clean monophonic audio chomp 260.

While in the hotword detection mode, the second stage hotword detector 220 executing on the AP 120 is configured to process the clean monophonic audio chomp 260 to determine whether the hotword is detected in the clean monophonic audio chomp 260. In some examples, the second stage hotword detector 220 corresponds to a parallel hotword detection architecture that performs hotword detection in two branches 220a, 220b using the same model but independently on two different inputs: the respective raw audio data 212a of one channel of the chomped multi-channel raw audio data 212; and the clean monophonic audio chomp 260. The channel associated with the respective raw audio data 212a provided as input to the second branch 220b of the second stage hotword detector 220 may be arbitrary. Accordingly, the AP 120 may process the clean monophonic audio chomp 260 at a first branch 220a of the second stage hotword detector 220 in parallel with processing the respective raw audio data 212a of the one channel of the chomped multi-channel raw audio data 212 at the second branch 220b of the second stage hotword detector 220. In the example shown, when a logical OR 270 operation indicates that the hotword is detected by the second stage hotword detector 220 in either one of the clean monophonic audio chomp 260 (e.g., at the first branch 220a) or the respective raw audio data 212a (e.g., at the second branch 220b), the AP 120 initiates a wake-up process on the user device 102 for processing the hotword and/or one or more other terms following the hotword in the streaming multi-channel audio 118. As with the first stage hotword detector 210, the second stage hotword detector 220 may detect the presence of the hotword when a probability score associated with the respective clean monophonic audio chomp 260 or the respective raw audio data 212 satisfies a probability score threshold. The probability score threshold used by the second stage hotword detector 220 may be the same or different value than the probability score threshold used by the first stage hotword detector 210.

Generally, hotword detection performance is measured by two error rates: false accept rate (FAR) (e.g., detecting a hotword incorrectly) and false reject rate (FRR) (e.g., failing to detect a present hotword). Thus, a hotword can be identified by any of the cascade hotword detection architectures 200 only when both the first stage hotword detector 210 and the second stage hotword detector 220 detect the hotword. Consequently, an overall FAR of the cascade hotword detection architectures 200a, 200b is lower than either of the FARs of the first stage hotword detector 210 and the second stage hotword detector 220. Additionally, the overall FRR of the cascade hotword detection architectures 200a, 200b is higher than either of the FRRs of the first stage hotword detector 210 and FRR of the second stage hotword detector 220. For example, when keeping the FRR of the first stage hotword detector 210 low, the overall FRR will be about the same as the FRR of the second stage hotword detector 220. In some examples, the FAR of the first stage hotword detector 210 is set to a reasonable value such that the second stage hotword detector 220 will not be frequently triggered to mitigate power consumption by the AP 120. However, in the cascade hotword architectures 200a, 200b of FIGS. 2A and 2B, the first stage hotword detector 210 does not benefit from the cleaner 250, and thus, their FRRs in noisy environments will be high even if the FAR of the first stage hotword detector 210 is tuned to a higher value. Accordingly, the cascade hotword architectures 200a, 200b of FIGS. 2A-2C experience lower performance than the cascade hotword detection architecture 200c of FIG. 2C which employs a lightweight cleaner 250b (e.g. cleaner lite) at the DSP 110.

To achieve an optimal balance between a small footprint, low latency, and maximized accuracy in both clean and noisy environments, the example cascade hotword detection architecture 200c of FIG. 2C includes the DSP 110 employing a first stage cleaner 250b (e.g., cleaner-lite) that executes a second noise cleaning algorithm to processes the respective audio features of each channel 119 of the streaming multi-channel audio 118 and generate a monophonic clean audio stream 255 prior to executing/running the first stage hotword detector 210 to determine whether the candidate hotword is detected in the monophonic clean audio stream 255. In other words, the cleaner-lite 250*b* employed by the DSP 110 executes the second noise cleaning algorithm to provide adaptive noise cancellation to the streaming multi-channel audio 118 such that the resulting monophonic clean audio stream 255 input to the first stage hotword detector 210 includes an improved SNR compared to the respective raw audio features of the single channel 119 input to the detector 210 in the architectures 200*a*, 200*b* of FIGS. 2A and 2B. Thus, hotword detection accuracy of the first stage hotword detector 210 increases when the first stage hotword detector 210 is able to coarsely screen the monophonic clean audio stream 255 for hotword candidates, as apposed to coarsely screening for hotword candidates in raw audio features of a single channel.

While a filter model for the first and second noise cleaning algorithms may be the same, or in the alternative, substantially similar, the second noise cleaning algorithm executing on the cleaner-lite 250*b* at the DSP 110 may include a shorter length (e.g., less filtering parameters) than the first noise cleaning algorithm executing on the cleaner engine 250*a* at the AP 120 since the DSP 110 includes a lower computational power than the computational power of the AP 120. For example, the first noise cleaning algorithm may apply a first finite impulse response (FIR) on each channel of the chomped multi-channel raw audio data 212 to generate the clean monophonic audio chomp 260, while the second noise cleaning algorithm may apply a second FIR on each channel 119 of the streaming multi-channel audio 118 to generate the monophonic clean audio stream 255. In this example, the first FIR at the cleaner engine 250*a* may include a first filter length and the second FIR at the cleaner-lite 250*b* may include a second filter length that is less than the first filter length. Accordingly, the cleaner-lite 250*b* employed by the DSP 110 sacrifices some performance (e.g., signal-to-noise ratio (SNR) performance) compared to the cleaner engine 250*a* employed by the AP 120, but still provides adequate noise robustness to improve the accuracy of the first stage hotword detector 210.

FIG. 2C shows the always-on DSP 110 (e.g., first processor) including/executing the cleaner-lite 250 (e.g., cleaner), the first stage hotword detector 210, the audio chomper 215, and the cleaner frontend 252. The cleaner-lite 250*b* receives, as input, the respective audio features of both of the channels 119*a*, 119*b* of the streaming multi-channel audio 118 and executes the second noise cleaning algorithm to generate the monophonic clean audio stream 255 from each channel 119*a*, 119*b* of the streaming multi-channel audio 118. Upon generating the monophonic clean audio stream 255, the DSP 110 uses/executes the first stage hotword detector 210 to process the monophonic clean audio stream 255 to determine whether a hotword is detected by the first stage hotword detector 210 in the monophonic clean audio stream 255. Optionally, and conditioned upon the DSP 110 not being constrained by computational limitations, the first stage hotword detector 210 may correspond to a parallel hotword detection architecture that performs hotword detection in two branches using the same model but independently on two different inputs: the respective raw audio features of one channel 119*a* of the streaming multi-channel audio 118; and the monophonic clean audio stream 255. In this optional configuration, a logical and/or operation may be used to determine the hotword is present in the streaming multi-channel audio 118 when the hotword is detected in either of the two hotword detection branches of the first stage hotword detector 210.

At the same time the cleaner-lite 250*b* is executing the second noise cancellation algorithm, the audio chomper 215 and the cleaner frontend 252 receive the respective audio features of each channel 119*a*, 119*b* of the streaming multi-channel audio 118 such that the cleaner frontend 252 generates the multi-channel cross-correlation matrix 254 associated with the calculation of noise cancellation between the respective audio features of each channel 119*a*, 119*b* of the streaming multi-channel audio 118. More specifically, and as discussed above with reference to FIGS. 2B and 3, the cleaner frontend 252 continuously calculates/updates and buffers the multi-channel cross-correlation matrix 254 as the streaming multi-channel audio 118 is received. The cleaner frontend 252 may buffer the multi-channel cross-correlation matrices 254 in the memory hardware 105 (FIG. 1) of the user device 102 as discussed above with reference to FIG. 3.

The first stage hotword detector 210 may calculate a probability score indicating a presence of a hotword in the monophonic clean audio stream 255 of the streaming multi-channel audio 118. In some examples, a determination that a probability score of the monophonic clean audio stream 255 satisfies a hotword threshold (e.g., when the probability score is greater than or equal to the hotword threshold) indicates that the hotword is present in the streaming multi-channel audio 118. In some implementations, when the first stage hotword detector 210 detects the hotword in the streaming multi-channel audio 118, the DSP 110 triggers/fires the audio chomper 215 to use the multi-channel cross-correlation matrix 254 generated and stored in the buffer 305 (FIG. 3) by the cleaner frontend 252 for chomping the respective raw audio data 212*a*, 212*b* from the respective audio features of each respective channel 119*a*, 119*b* of the streaming multi-channel audio 118. Thereafter, the audio chomper 215 provides the chomped multi-channel raw audio data 212 to the cleaner engine 250*a* at the AP 120. Here, the providing of the chomped multi-channel raw audio data 212 from the DSP 110 to the AP 120 may invoke/trigger the AP 120 to transition from the sleep mode to a hotword detection mode in which the AP 120 executes the first noise cleaning algorithm on the cleaner engine 250*a* and the second stage hotword detector 220.

Detection of the hotword by the first stage hotword detector 210 also causes the DSP 110 to instruct the cleaner frontend 252 to provide the multi-channel cross-correlation matrix 254 to the cleaner engine 250*a* of the AP 120. Here, the cleaner engine 250*a* uses the multi-channel cross-correlation matrix 254 to compute cleaner filter coefficients for the first noise cleaning algorithm. Thereafter, the cleaner engine 250*a* executes the first noise cleaning algorithm having the computed cleaner coefficients to process each channel of the chomped multi-channel audio data 212 provided from the audio chomper 215 to generate the clean monophonic audio chomp 260.

While in the hotword detection mode, the second stage hotword detector 220 executing on the AP 120 is configured to process the clean monophonic audio chomp 260 to determine whether the hotword is detected in the clean monophonic audio chomp 260. In some examples, the second stage hotword detector 220 corresponds to a parallel hotword detection architecture that performs hotword detection in two branches 220*a*, 220*b* using the same model but independently on two different inputs: the respective raw audio data 212*a* of one channel of the chomped multi-channel raw audio data 212; and the clean monophonic audio chomp 260. The channel associated with the respective raw audio data 212a provided as input to the second branch 220b of the second stage hotword detector 220 may be arbitrary. Accordingly, the AP 120 may process the clean monophonic audio chomp 260 at a first branch 220a of the second stage hotword detector 220 in parallel with processing the respective raw audio data 212a of the one channel of the chomped multi-channel raw audio data 212 at the second branch 220b of the second stage hotword detector 220. In the example shown, when a logical OR 270 operation indicates that the hotword is detected by the second stage hotword detector 220 in either one of the clean monophonic audio chomp 260 (e.g., at the first branch 220a) or the respective raw audio data 212a (e.g., at the second branch 220b), the AP 120 initiates a wake-up process on the user device 102 for processing the hotword and/or one or more other terms following the hotword in the streaming multi-channel audio 118. As with the first stage hotword detector 210, the second stage hotword detector 220 may detect the presence of the hotword when a probability score associated with the respective clean monophonic audio chomp 260 or the respective raw audio data 212 satisfies a probability score threshold. The probability score threshold used by the second stage hotword detector 220 may be the same or different value than the probability score threshold used by the first stage hotword detector 210.

In some examples, the second stage hotword detector 220 utilizes a multichannel hotword model trained to detect hotwords in multi-channel inputs. In these examples, the second stage hotword detector 220b is configured to ingest all the chomped multi-channel raw audio data 212 and make a determination of whether or not the hotword is detected in the chomped multi-channel raw audio data 212. Similarly, in these examples, the cleaner engine 250a may be adapted to replicate the clean monophonic audio chomp 260 into a multichannel output so that the multichannel hotword model at the first branch 220a of the second stage hotword detector 220 ingests a clean multichannel audio chomp 260. In lieu or producing a multichannel output, the cleaner engine 250a may instead be adapted to ingest the entire chomped multi-channel raw audio data 212 for producing a clean multi-channel audio chomp 260. The multichannel hotword model may include a memorized neural network having a three-dimensional (3D) single value decomposition filter (SVDF) input layer and a sequentially-stacked SVDF layers as disclosed in International Patent Application PCT/US20/13705, filed on Jan. 15, 2020, the contents of which are incorporated by reference in their entirety. In other examples, the second stage hotword detector 220 utilizes a multichannel hotword model trained to detect hotwords in both a raw multichannel raw audio data 212 and a clean multichannel audio chomp 260.

Figure 4:
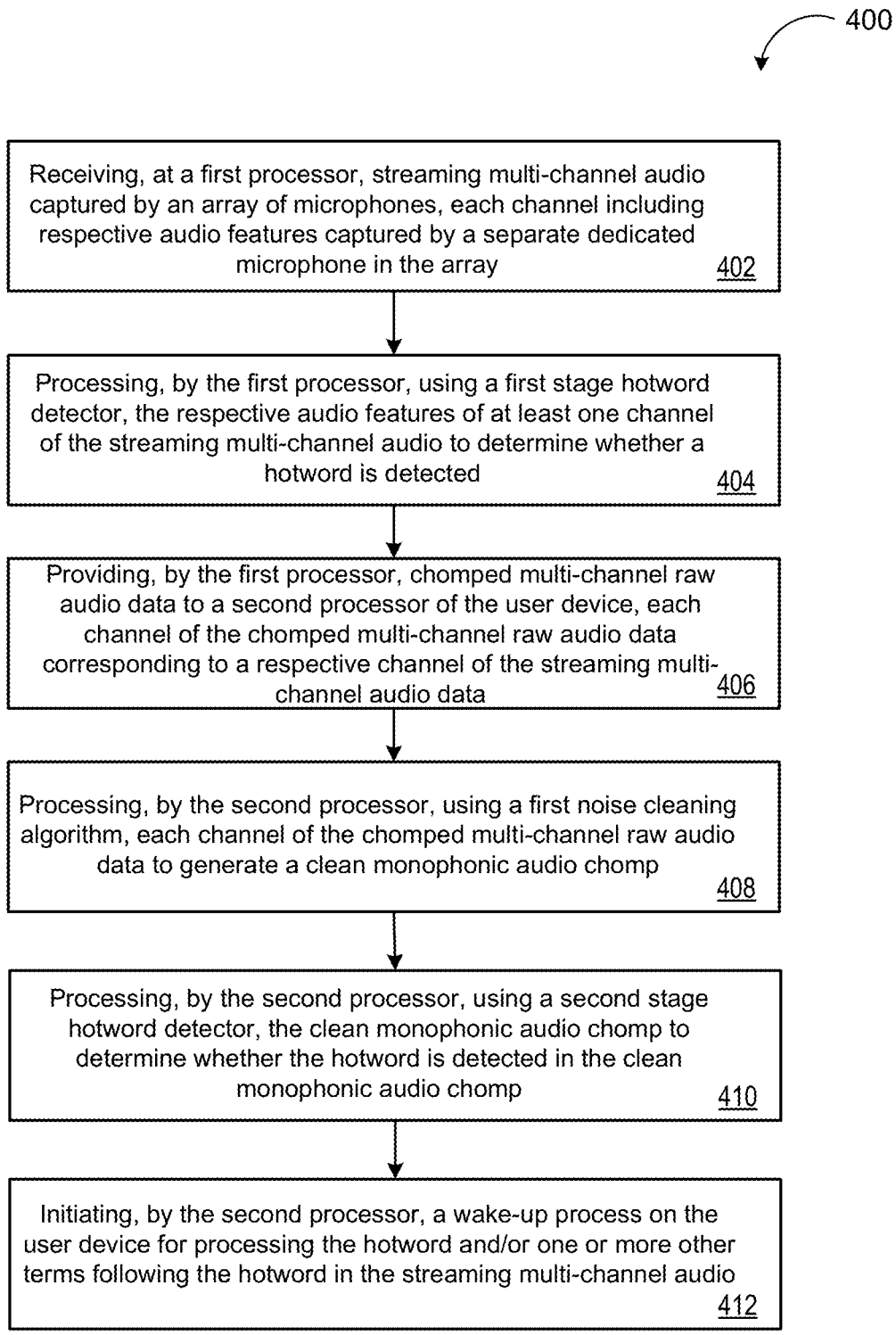
FIG. 4 is a flowchart of an example arrangement of operations for a method of detecting hotwords in streaming multi-channel audio using a noise-robust cascade hotword detection architecture.

FIG. 4 is a flowchart of an example arrangement of operations for a method 400 of detecting hotwords in streaming multi-channel audio 118 using a noise-robust cascade hotword detection architecture 200. At operation 402, the method 400 includes receiving, at a first processor 110 of a user device 102, streaming multi-channel audio 118 captured by an array of microphones 107 in communication with the first processor 110. Here, the first processor 110 may include an always-on DSP. Each channel 119 of the streaming multi-channel audio includes respective audio features captured by a separate dedicated microphone 107 in the array of microphones 107.

At operation 404, the method 400 includes processing, by the first processor 110, using a first stage hotword detector 210, the respective audio features of at least one channel of the streaming multi-channel audio 118 to determine whether a hotword is detected by the first stage hotword detector 210. When the first stage hotword detector 210 detects the hotword in the streaming multi-channel audio 118, the method 400 includes, at operation 406, providing, by the first processor 110, chomped multi-channel raw audio data 212 to a second processor of the user device 102. Each channel of the chomped multi-channel raw audio data 212 corresponding to a respective channel 119 of the streaming multi-channel audio 118 and including respective raw audio data chomped from the respective channel 119 of the streaming multi-channel audio 118. The second processor 120 may include a device SoC, such as an AP. Prior to detecting the hotword at the first stage hotword detector 210, the second processor 120 may be operating in a sleep mode to conserve power and computational resources. Upon detecting the hotword at the first stage hotword detector 210, the first processor 110 triggers/invokes the second processor 120 to transition from the sleep mode and into a hotword detection mode. The passing of the chomped multi-channel raw audio data 212 from the first processor 110 to the second processor 120 may serve as the basis for invoking/triggering the second processor 120 to transition to the hotword detection mode. Thus, the first processor 110 is configured to transition the second processor out of the sleep mode and into the hotword detection mode when the first stage hotword detector 210 detects the hotword in the streaming multi-channel audio 118. The hotword can be a predetermined term phrase of one or more words, for example, "Hey Google" and/or any other term/phrase that can be used to initialize an application. The hotword can be a custom hotword in some configurations.

At operation 408, the method 400 also includes processing, by the second processor 120, using a first noise cleaning algorithm 250, each channel of the chomped multi-channel raw audio data 212 to generate a clean monophonic audio chomp 260. Each channel of the chomped multi-channel raw audio data 212 includes a respective audio segment 213 containing the detected hotword and a respective prefix segment 214 including a duration of noisy audio prior to the detected hotword. The prefix segment 214 includes a duration sufficient for the first noise cleaning algorithm 250 to process enough noisy audio preceding the detected hotword for generating the clean mononphonic audio chomp 260. While prefix segments 214 with longer duration increase performance of the first noise cleaning algorithm, longer prefix segments also equate to increase latency. Accordingly, the respective prefix segment 214 of each channel of the multi-channel raw audio data 212 may include a duration that optimizes cleaning performance and latency.

At operation 410, the method 400 also includes processing, by the second processor 120, using a second stage hotword detector 220, the clean monophonic audio chomp 260 to determine whether the hotword is detected by the second stage hotword detector 220 in the clean monophonic audio chomp 260. At operation 412, when the hotword is detected by the second stage hotword detector 220 in the clean monophonic audio chomp 260, the method 400 also includes initiating, by the second processor 120, a wake-up process on the user device 102 for processing the hotword and/or one or more other terms following the hotword in the streaming multi-channel audio 118.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
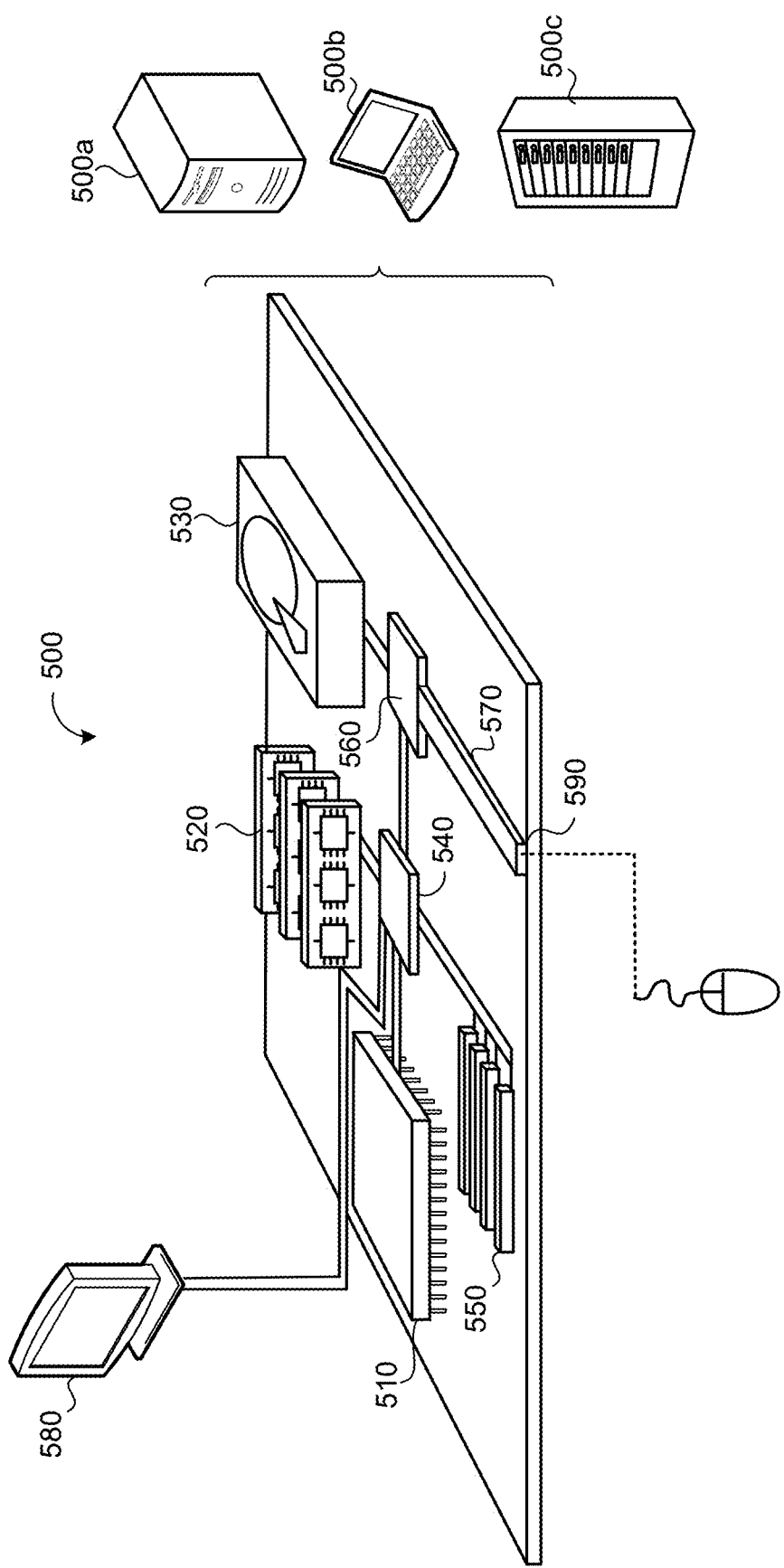
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware of a user device that causes the data processing hardware to perform operations comprising:
    receiving streaming multi-channel audio captured by an array of microphones, each channel of the streaming multi-channel audio comprising respective audio features captured by a separate dedicated microphone in the array of microphones;
    processing, using a noise cleaning algorithm, the respective audio features of each channel of the multi-channel audio to generate a clean multi-channel audio output;
    processing, using a first stage hotword detector, the respective audio features of at least one channel of the streaming multi-channel audio to determine that a hotword is detected by the first stage hotword detector in the streaming multi-channel audio;
    based on determining that the hotword is detected by the first stage hotword detector in the streaming multi-channel audio, processing in parallel, using a second stage hotword detector:
        the clean multi-channel audio output generated using the noise cleaning algorithm to determine whether the hotword is detected by the second stage hotword detector in the clean multi-channel audio output; and
        the respective audio features of one of the channels selected from the streaming multi-channel audio to determine whether the hotword is detected by the second stage hotword detector in the respective audio features of the selected channel; and
    when the hotword is detected by the second stage hotword detector in either one of the clean multi-channel audio output or the respective audio features of the selected channel, initiating a wake-up process on the user device.

2. The method of claim 1, wherein the operations further comprise, when the hotword is not detected by the second stage hotword detector in either one of the clean multi-channel audio output or the respective audio features of the selected channel, preventing initiation of the wake-up process on the user device.

3. The method of claim 1, wherein the data processing hardware comprises:
    a first processor that executes the first stage hotword detector; and
    a second processor that executes the second stage hotword detector.

4. The method of claim 3, wherein:
    the first processor comprises a digital signal processor; and
    the second processor comprises a system on a chip (SoC) processor.

5. The method of claim 3, wherein:
    the second processor operates in a sleep mode when the streaming multi-channel audio is received at the first processor and the respective audio features of the at least one channel of the streaming multi-channel audio are processed by the first stage hotword detector; and
    the first processor invokes the second processor to transition from the sleep mode to a hotword detection mode when the first stage hotword detector detects the hotword in the streaming multi-channel audio.

6. The method of claim 3, wherein the user device comprises a rechargeable finite power source, the finite power source powering the first processor and the second processor.

7. The method of claim 1, wherein the user device comprises a smart phone.

8. The method of claim 1, wherein the user device comprises a tablet.

9. The method of claim 1, wherein the user device comprises smart headphones.

10. The method of claim 1, wherein the user device comprises a smart speaker.

11. A system comprising:
    data processing hardware of user device; and
    memory hardware in communication with the data processing hardware and storing instructions that when executed on the data processing hardware causes the data processing hardware to perform operations comprising:

receiving streaming multi-channel audio captured by an array of microphones, each channel of the streaming multi-channel audio comprising respective audio features captured by a separate dedicated microphone in the array of microphones;

processing, using a noise cleaning algorithm, the respective audio features of each channel of the multi-channel audio to generate a clean multi-channel audio output;

processing, using a first stage hotword detector, the respective audio features of at least one channel of the streaming multi-channel audio to determine that a hotword is detected by the first stage hotword detector in the streaming multi-channel audio;

based on determining that the hotword is detected by the first stage hotword detector in the streaming multi-channel audio, processing in parallel, using a second stage hotword detector:

the clean multi-channel audio output generated using the noise cleaning algorithm to determine whether the hotword is detected by the second stage hotword detector in the clean multi-channel audio output; and the respective audio features of one of the channels selected from the streaming multi-channel audio to determine whether the hotword is detected by the second stage hotword detector in the respective audio features of the selected channel; and when the hotword is detected by the second stage hotword detector in either one of the clean multi-channel audio output or the respective audio features of the selected channel, initiating a wake-up process on the user device.

12. The system of claim 11, wherein the operations further comprise, when the hotword is not detected by the second stage hotword detector in either one of the clean multi-channel audio output or the respective audio features of the selected channel, preventing initiation of the wake-up process on the user device.

13. The system of claim 11, wherein the data processing hardware comprises:
a first processor that executes the first stage hotword detector; and
a second processor that executes the second stage hotword detector.

14. The system of claim 13, wherein:
the first processor comprises a digital signal processor; and
the second processor comprises a system on a chip (SoC) processor.

15. The system of claim 13, wherein:
the second processor operates in a sleep mode when the streaming multi-channel audio is received at the first processor and the respective audio features of the at least one channel of the streaming multi-channel audio are processed by the first stage hotword detector; and
the first processor invokes the second processor to transition from the sleep mode to a hotword detection mode when the first stage hotword detector detects the hotword in the streaming multi-channel audio.

16. The system of claim 13, wherein the user device comprises a rechargeable finite power source, the finite power source powering the first processor and the second processor.

17. The system of claim 11, wherein the user device comprises a smart phone.

18. The system of claim 11, wherein the user device comprises a tablet.

19. The system of claim 11, wherein the user device comprises smart headphones.

20. The system of claim 11, wherein the user device comprises a smart speaker.

* * * * *